(12) United States Patent
Morikawa et al.

(10) Patent No.: US 7,247,597 B2
(45) Date of Patent: Jul. 24, 2007

(54) COMPOSITE OXIDE, PROCESS FOR PRODUCING THE SAME, AND EXHAUST GAS REDUCING CO-CATALYST

(75) Inventors: Akira Morikawa, Aichi (JP); Yasutaka Nagai, Aichi (JP); Toshitaka Tanabe, Aichi (JP); Tadashi Suzuki, Aichi (JP); Akihiko Suda, Aichi (JP); Hideo Sobukawa, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 545 days.

(21) Appl. No.: 10/225,186

(22) Filed: Aug. 22, 2002

(65) Prior Publication Data

US 2003/0050189 A1 Mar. 13, 2003

(30) Foreign Application Priority Data

Aug. 30, 2001 (JP) .............................. 2001-261260
Mar. 18, 2002 (JP) .............................. 2002-074719

(51) Int. Cl.
*B01J 23/00* (2006.01)
*C01G 49/00* (2006.01)
*C04B 35/48* (2006.01)

(52) U.S. Cl. ...................... 502/304; 502/305; 502/349; 502/351; 423/594.12; 423/608; 501/103

(58) Field of Classification Search ................ 502/304, 502/325, 349, 351, 305; 423/594.12, 608; 501/103

See application file for complete search history.

(56) References Cited

U.S. PATENT DOCUMENTS 5,147,842 A * 9/1992 Funabiki et al. ............ 502/304

(Continued)

FOREIGN PATENT DOCUMENTS

EP 0 614 854 A1 9/1994

(Continued)

OTHER PUBLICATIONS

J. Cuif, et al., "New Generation of Rare Earth Compounds for Automotive Catalysis", SAE Technical Paper Series, No. 961906, International Fall Fuels & Lubricants Meeting & Exposition, San Antonio, TX, pp. 73-81 (Oct. 14-17, 1996).

*Primary Examiner*—J. A. Lorengo
*Assistant Examiner*—Patricia L. Hailey
(74) *Attorney, Agent, or Firm*—Oblon, Spivak, McClelland, Maier & Neustadt, P.C.

(57) ABSTRACT

A composite oxide includes $CeO_2$, $ZrO_2$ and a metallic oxide being free from reacting with $CeO_2$ and $ZrO_2$ at 700° C. or more, preferably at 900° C. or more and further preferably at 1,000° C. or more. The composite oxide has a regulatory oriented phase, such as a pyrochlore phase, etc., in which at least a part of Ce cations and Zr cations are oriented regularly. The composite oxide makes a catalytic support. The $CeO_2$—$ZrO_2$ composite oxide and the reaction-free metallic oxide make barriers each other which suppress the granular growth when the composite oxide is subjected to high-temperature heat in a reducing heat treatment to form the regulatory oriented phase. The regulatory oriented phase improves the oxygen storage-and-release capability of the catalytic support. Thus, it is possible to simultaneously attain a large a specific surface area and a high oxygen storage-and-release capability.

9 Claims, 2 Drawing Sheets

U.S. PATENT DOCUMENTS

| | | | |
|---|---|---|---|
| 5,582,785 A * | 12/1996 | Yao et al. | 502/304 |
| 5,747,401 A * | 5/1998 | Cuif | 501/103 |
| 5,837,642 A | 11/1998 | Tanaka et al. | 502/304 |
| 6,040,265 A * | 3/2000 | Nunan | 502/242 |
| 6,150,288 A * | 11/2000 | Suzuki et al. | 501/105 |
| 6,214,306 B1 * | 4/2001 | Aubert et al. | 423/213.2 |
| 6,306,794 B1 * | 10/2001 | Suzuki et al. | 502/304 |
| 6,335,305 B1 * | 1/2002 | Suzuki et al. | 502/325 |
| 6,492,298 B1 * | 12/2002 | Sobukawa et al. | 502/325 |
| 6,528,451 B2 * | 3/2003 | Brezny et al. | 502/304 |
| 6,762,147 B2 * | 7/2004 | Morikawa et al. | 502/242 |
| 6,852,665 B2 * | 2/2005 | Morikawa et al. | 502/302 |
| 6,933,259 B2 * | 8/2005 | Hatanaka et al. | 502/240 |
| 2003/0083194 A1 * | 5/2003 | Sung | 502/304 |
| 2004/0234439 A1 * | 11/2004 | Takeshima et al. | 423/263 |

FOREIGN PATENT DOCUMENTS

| | | | |
|---|---|---|---|
| EP | 0 684 073 A1 | | 11/1995 |
| EP | 0 842 900 | | 5/1998 |
| EP | 1 040 870 | | 10/2000 |
| EP | 1 180 397 | | 2/2002 |
| JP | 08-215569 | | 8/1996 |
| JP | 09-175822 | | 7/1997 |
| JP | 09-175823 | | 7/1997 |
| JP | 09-278444 | | 10/1997 |
| JP | 11-165067 | | 6/1999 |
| JP | 2001-104782 | | 4/2001 |
| JP | 2005-170774 | * | 6/2005 |
| WO | WO 97/02213 | * | 1/1997 |

* cited by examiner

COMPOSITE OXIDE, PROCESS FOR PRODUCING THE SAME, AND EXHAUST GAS REDUCING CO-CATALYST

BACKGROUND OF THE INVENTION

1. Field of the Invention

The present invention relates to an exhaust gas reducing co-catalyst which not only has a sufficiently large specific surface area but also a high oxygen storage-and-release capability (hereinafter abbreviated to as "OSC"), and which is good in terms of the durability, a composite oxide which is used as a support for the exhaust gas reducing co-catalyst, and a process for producing the same.

2. Description of the Related Art

Conventionally, as a catalyst for purifying an automotive exhaust gas, a 3-way catalyst has been used which oxidizes CO and HC and reduces $NO_x$ in the exhaust gas simultaneously. As for such a 3-way catalyst, for example, a catalyst has been known widely in which a support layer, being composed of $\gamma$-$Al_2O_3$, is formed on a heat resistant honeycomb substrate, being composed of cordierite, etc., and a noble metal, such as platinum (Pt), rhodium (Rh), etc., is loaded in the support layer.

By the way, as the conditions required for the support used in the catalyst for purifying an exhaust gas, it is possible to name a large specific surface area and a high heat resistance. In general, $Al_2O_3$, $SiO_2$, $ZrO_2$, $TiO_2$, etc., have been used often. Further, by combinedly using $CeO_2$ having an OSC as a co-catalyst, it has been carried out relieving the atmosphere fluctuation of exhaust gas.

However, in the conventional catalyst for purifying an exhaust gas, there arise the decrement of the specific surface area of the support by sintering and the granular growth of the noble metal when it is subjected to a high temperature exceeding 800° C. Moreover, since the OSC, possessed by $CeO_2$, decreases as well, there has been a drawback in that the purifying performance of the conventional catalyst degrades sharply.

In addition, since the exhaust gas emission control has been strengthened recently, it has been required strongly to purify an exhaust gas even in a very short period of time after starting an engine. In order to do so, it is required to activate the catalysts at a much lower temperature and to purify the emission-controlled components. Among them, a co-catalyst, in which Pt is loaded on $CeO_2$, is excellent in terms of the performance for purifying CO starting at a low temperature. When such a co-catalyst is used, the CO-adsorption poisoning of Pt is relieved by igniting CO at a low temperature, and the igniting ability of HC is enhanced. Further, with these advantageous effects, the warm-up of the catalyst surface is facilitated, and accordingly it is possible to purify HC from a low temperature region. Furthermore, in this co-catalyst, $H_2$ is produced by a water gas shift reaction in a low temperature region, and consequently it is possible to reduce and purify $NO_x$ by the reactions of $H_2$ and $NO_x$ from a low temperature region.

However, the conventional co-catalyst, in which Pt, etc., is loaded on $CeO_2$, lacks the durability in actual exhaust gases. It is not practical because $CeO_2$ causes the sintering by heat. In order to use it in actual exhaust gases, it is necessary to upgrade the heat resistance without losing the properties of $CeO_2$. Moreover, accompanied by the sintering of $CeO_2$, Pt causes the granular growth so that the activity decreases. Hence, it has been required to stabilize Pt loaded on $CeO_2$.

Moreover, even in a 3-way catalyst which includes $CeO_2$ in its support, its OSC, which is revealed by $CeO_2$, lowers when it is exposed to a high temperature. The disadvantage is caused by the sintering of $CeO_2$, the granular growth of the noble metal loaded thereon, the oxidation of the noble metal, the solving of Rh in $CeO_2$, and so on. Thus, in a catalyst which exhibits a low OSC (or which has a small $CeO_2$ content), the novel metal is likely to be exposed to a fluctuating atmosphere, and the deterioration (e.g., the agglomeration or solving) of the noble metal is furthermore facilitated.

Therefore, in Japanese Unexamined Patent Publication (KOKAI) No. 8-215,569, there is disclosed a technology using a $Ceo_2$—$ZrO_2$ composite oxide which is prepared from a metallic alkoxide. Since the $CeO_2$—$ZrO_2$ composite oxide, which is prepared from the metallic alkoxide by a sol-gel method, makes a solid solution in which Ce and Zr are composited at atomic level or molecular level, it is improved in terms of the durability and securely exhibits a high OSC from initial to post-durability service.

It is possible to produce such a composite oxide by preparing oxide precursors, which include a plurality of metallic elements, by an alkoxide method, a co-precipitation method, and the like, and by calcining them thereafter. Among them, since the co-precipitation method is less expensive in terms of the material cost compared to that of the alkoxide method, it effects an advantage in that the resulting composite oxide is less expensive. Hence, the co-precipitation method has been used widely in the production of composite oxides.

However, the composite oxide, which is set forth in Japanese Unexamined Patent Publication (KOKAI) No. 8-215,569, is still insufficient in terms of the OSC. Consequently, it has been required to furthermore improve the OSC. Hence, in Japanese Unexamined Patent Publication (KOKAI) No. 11-165,067, there is set forth a process in which precipitates are formed out of a solution, including a cerium (III) salt and a zirconium (IV) salt, by a co-precipitation method and the resulting precipitates are heated to and held at a temperature of from 800 to 1,000° C. in an inert atmosphere or a non-oxidizing atmosphere. By the process, the resulting composite oxide has an X-ray diffraction peak which is derived from a pyrochlore phase, and exhibits a high OSC.

The process, which is set forth in Japanese Unexamined Patent Publication (KOKAI) No. 11-165,067, surely gives a $CeO_2$—$ZrO_2$ composite oxide which has a high OSC. However, in the process, since the precipitates are heated to and held at a temperature of from 800 to 1,000° C., it is inevitable to decrease the specific surface area of the $CeO_2$—$ZrO_2$ composite oxide. Accordingly, when the $CeO_2$—$ZrO_2$ composite oxide is used to make an exhaust gas reducing co-catalyst, it is difficult to attain practically high reducing activities.

Moreover, in Japanese Unexamined Patent Publication (KOKAI) No. 2001-104,782, there is set forth a process in which a noble metal is loaded on an $Al_2O_3$—$CeO_2$—$ZrO_2$ composite oxide and the $Al_2O_3$—$CeO_2$—$ZrO_2$ composite oxide with the noble metal loaded is heat-treated in a non-oxidizing atmosphere at a temperature of from 1,050 to 1,150° C. Thus, the noble metal is fixed physically in the pores of the $Al_2O_3$—$CeO_2$—$ZrO_2$ composite oxide support. Consequently, it is possible to inhibit the granular growth of the noble metal.

However, in the process which is set forth in Japanese Unexamined Patent Publication (KOKAI) No. 2001-104,782, since sintering occurs in the support comprising the $Al_2O_3$—$CeO_2$—$ZrO_2$ composite oxide by the heat treatment at 1,050° C. or more, the supports exhibits a lowered OSC. Accordingly, it is difficult to attain practical performance as an exhaust gas reducing co-catalyst.

The present invention has been developed in view of such circumstances. It is therefore an object of the present invention to provide a composite oxide which can attain a large specific surface area and a high OSC simultaneously. At the same time, it is another object of the present invention to provide an exhaust gas reducing co-catalyst in which the composite oxide makes a support and a fine noble metal is loaded on the support, and which exhibits high reducing activities.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

SUMMARY OF THE INVENTION

Figure 1:
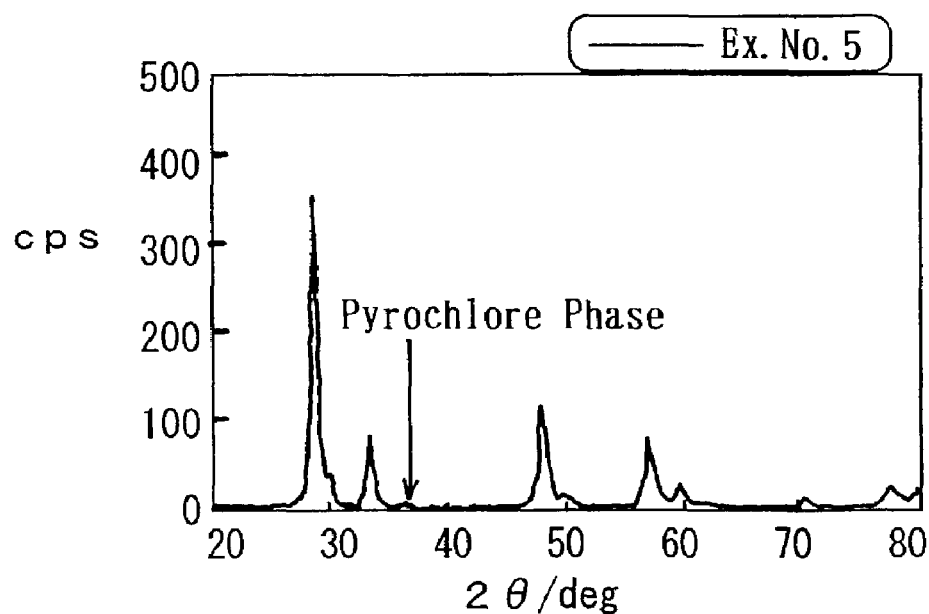
FIG. 1 is an X-ray diffraction chart on a composite oxide of Example No. 4.

A composite oxide according to the present invention can carry out the object, comprises $CeO_2$ and $ZrO_2$ as major components, and has a regularly orientated phase in which at least a part of Ce cations and Zr cations are oriented regularly and has a specific surface area of 20 m$^2$/g or more, preferably 35 m$^2$/g or more, further preferably 60 m$^2$/g or more.

The composite oxide can desirably be composed of $CeO_2$, $ZrO_2$ and a metallic oxide being free from reacting with $CeO_2$ and $ZrO_2$ at 700° C. or more, preferably at 900° C. or more and further preferably at 1,000° C. or more. Further, the $CeO_2$ and $ZrO_2$ can desirably form a solid solution in which they are solved with each other partially at least. Furthermore, the reaction-free metallic oxide can desirably be $Al_2O_3$.

Moreover, an exhaust gas reducing co-catalyst according to the present invention can carry out the object, and comprises: a support comprising the present composite oxide; and a noble metal loaded on the support.

In addition, another exhaust gas reducing co-catalyst can be produced by a process, comprising the steps of: loading a noble metal on a support comprising a composite oxide comprising at least Ce and Zr; and heat-treating the support with the noble metal loaded at a temperature of from 600 to 1,000° C. in a reducing atmosphere.

After fully oxidized at about 500° C. in an oxidizing atmosphere, the co-catalyst can desirably release oxygen in an amount by 70% or more, preferably by 80% or more, of a theoretical limit value at 500° C. in a reducing atmosphere. Further, the exhaust gas reducing co-catalyst can desirably exhibit a specific surface area of 20 m$^2$/g or more, preferably 35 m$^2$/g or more, further preferably 60 m$^2$/g or more. Furthermore, in the exhaust gas reducing co-catalyst, the noble metal can desirably have a particle diameter falling in a range of from 0.5 to 10 nm.

Moreover, a process according to the present invention for producing the present composite oxide comprises the steps of: adding a precipitant to a solution comprising a cerium compound, a zirconium compound and a metal compound whose oxide is free from reacting with $CeO_2$ and $ZrO_2$ at 700° C. or more, preferably at 900° C. or more and further preferably at 1,000° C. or more, thereby generating precipitates by a co-precipitation method; calcining the precipitates; and reducing the precipitates by heating to and holding at a temperature of from 700 to 1,200° C., desirably from 800 to 1,000° C., further desirably from 800 to 900° C., in a reducing atmosphere.

In the present production process, it is desired that, before calcining the precipitates, the precipitates can desirably be aged in a suspended state in which water or a solution including water makes a dispersion medium or in a state in which water is present sufficiently. In addition, the aging treatment can desirably be a hydrothermal treatment in which the precipitates are subjected to a pressure of from 0.11 to 0.2 MPa at a temperature of from 100 to 200° C.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Although ordinary $CeO_2$—$ZrO_2$ composite oxides form solid solutions, there is no regularity in the orientation of the Ce cations and the Zr cations within the unit lattices. The mechanism of revealing an OSC is such that oxygen atoms are released by the electric neutrality principle in the instance in which the Ce cations within the unit lattices cause the valence number change from tetra-valent to tri-valent. Roughly observing, the oxygen atoms, released in this instance, are believed to be tetra-coordinated with respect to the Zr cations.

Therefore, in co-catalysts in which noble metals are loaded on ordinary $CeO_2$—$ZrO_2$ composite oxides having no regularity in the orientation of the Ce cations and the Zr cations, it is only possible to obtain an OSC which is remarkably less than the theoretical limit value because of the following reasons, and so forth. There are less number of oxygen atoms which are tetra-coordinated with respect to the Zr cations. In addition, when the Ce cations undergo the valence number change from tetra-valent to tri-valent, the ionic radius enlarges from 0.86 Å to 1.15 Å so that distortions occur in the lattices. As a result, oxygen atoms are less likely to be released.

On the other hand, the composite oxide according to the present invention comprises a composite oxide comprising $CeO_2$ and $ZrO_2$ as major components, has a regularly orientated phase, such as a pyrochlore phase, etc., in which at least a part of Ce cations and Zr cations are oriented regularly, and has a specific surface area of 20 m$^2$/g or more, preferably 35 m$^2$/g or more, further preferably 60 m$^2$/g or more. Therefore, the present composite oxide reveals an OSC as high as that of the composite oxide set forth in Japanese Unexamined Patent Publication (KOKAI) No. 11-165,067, and has a specific surface area larger than that of the composite oxide set forth in Japanese Unexamined Patent Publication (KOKAI) No. 11-165,067.

Moreover, in the exhaust gas reducing co-catalyst according to the present invention, a noble metal is loaded on a support in which the above-described present composite oxide makes a major component. Therefore, the present exhaust gas reducing co-catalyst not only has a large specific surface area but also a high OSC, thereby revealing practically high reducing activities.

In addition, in the other exhaust gas reducing co-catalyst according to the present invention, after loading a noble metal on a support in which the above-described present composite oxide makes a major component, the support is heat-treated at a temperature of from 600 to 1,000° C. in a reducing atmosphere. By carrying out the reducing heat treatment onto the support with the noble metal loaded, the other present exhaust gas reducing co-catalyst reveals such a high OSC that it releases oxygen in an amount by 70% or more, preferably by 80% or more, of a theoretical limit value at 500° C. in a reducing atmosphere even after it is fully oxidized at about 500° C. in an oxidizing atmosphere. Moreover, it exhibits exceptionally high activities.

Note that even the ordinary $CeO_2$—$ZrO_2$ composite oxides can store and release oxygen in an amount by 80% or more of a theoretical limit value when they are heat-treated in a reducing atmosphere at a temperature of more than 1,000° C. In this case, however, they exhibit a sharply decreased specific surface area so that they are less likely to make a practical catalyst support.

On the contrary, when a noble metal is loaded on a support comprising the present composite oxide in which $CeO_2$ and $ZrO_2$ make the major components, the noble metal makes the outlet and inlet for storing and releasing the lattice oxygen atoms of the $CeO_2$. Accordingly, it is possible to release the oxygen atoms at a much lower temperature in a reducing atmosphere than the conventional temperature at which the oxygen atoms are released. Since the oxygen atoms are thus released with ease, the Ce cations and the Zr cations approach a more regulatory orientation. Hence, it is believed that the present exhaust gas reducing co-catalysts reveal a high OSC. Moreover, since the support is heat-treated at a temperature of from 600 to 1,000° C. in a reducing atmosphere, the specific surface area of the support is inhibited from decreasing in the reducing heat treatment so that the support reveals high activities.

Moreover, since $CeO_2$ exhibits a high affinity to noble metals, not to speak of Pt, a strong interaction is exerted between the noble metals and $CeO_2$—$ZrO_2$ composite oxides during heat treatments in reducing atmospheres. Accordingly, the noble metals are inhibited from sintering which results from heat history. However, the noble metals cause granular growth to a certain extent in the reducing heat treatments. Consequently, it is possible to fall the particle diameters of the noble metals in a range of from 0.5 to 10 nm. When the particle diameters of the noble metals are thus equalized, the superficial partial pressures are equalized at the boundary between the particles of the noble metals. As a result, further granular growth of the noble metals is suppressed. Thus, the present co-catalysts are improved in terms of the durability.

In addition, in the process for producing a composite oxide according to the present invention, when the precipitates are calcined after the raw materials are co-precipitated, a $CeO_2$—$ZrO_2$ composite oxide and a metallic oxide, which is free from reacting with $CeO_2$ and $ZrO_2$ at 700° C. or more, preferably at 900° C. or more and further preferably at 1,000° C. or more, are formed at least. Then, the reaction-free metallic oxide intervenes between the $CeO_2$—$ZrO_2$ composite oxide. Therefore, in the reducing heat treatment in which the composite oxide is heated to and held at a temperature of from 700 to 1,200° C., the $CeO_2$—$ZrO_2$ composite oxide and the reaction-free metallic oxide make barriers with each other, thereby suppressing the granular growth. Hence, the resulting present composite oxide, which has a regularly oriented phase, such as a pyrochlore phase, etc., has a large specific surface area.

The present composite oxide, or the support in the present exhaust gas reducing co-catalysts, comprises the $CeO_2$—$ZrO_2$-based composite oxide in which $CeO_2$ and $ZrO_2$ make the major components. In addition to the composite oxide, the present composite oxide or the support can further include the other oxides, such as $Al_2O_3$, $TiO_2$, $SiO_2$, $Y_2O_3$, etc., or the other composite oxides. However, the other oxides or composite oxides can desirably occupy 70 atomic % or less of the entire present composite oxide or support.

The $CeO_2$—$ZrO_2$-based composite oxide is a ternary composite oxide of $CeO_2$, $ZrO_2$ and a metallic oxide free from reacting with $CeO_2$ and $ZrO_2$ at 700° C. or more, preferably at 900° C. or more and further preferably at 1,000° C. or more. In the ternary composite oxide, the $CeO_2$ and $ZrO_2$ can desirably be solved with each other partially at least. Thus, the heat resistance of the present composite oxide is improved, and it is possible to furthermore inhibit the specific surface area from decreasing. At the same time, the resulting present composite oxide reveals a much higher OSC. Moreover, in the ternary composite oxide, at least a part of the Ce cations and Zr cations can especially desirably be oriented regularly. Hence, in a support employing such a ternary composite oxide, the reaction-free metallic oxide intervenes between the $CeO_2$—$ZrO_2$ composite oxide. Accordingly, when the support is heat-treated in a reducing atmosphere at a temperature of from 600 to 1,000° C., the $CeO_2$—$ZrO_2$ composite oxide and the reaction-free metallic oxide make barriers with each other, thereby suppressing the granular growth in the support.

In the above-described ternary composite oxide, a regularly oriented phase, such as a pyrochlore phase, etc., is formed by the reducing heat treatment. Accordingly, at least a part of the Ce cations and Zr cations are regularly oriented. Therefore, the oxygen atoms are released furthermore readily because of the following reasons, and so forth. There are more number of oxygen atoms which are tetra-coordinated with respect to the Zr cations. In addition, the lattice distortion diminishes so that oxygen atoms are likely to be released, lattice distortion which is caused by the ionic radius enlargement from 0.86 Å to 1.15 Å when the Ce cations undergo the valence number change from tetra-valent to tri-valent. Accordingly, the present composite oxide can exhibit a furthermore improved OSC. Moreover, the present composite oxide can maintain a large specific surface area. At the same time, due to the above-described reasons, the present composite oxide inhibits the granular growth of noble metals. Thus, the present co-catalysts are good in terms of the durability.

As for the metallic oxide which is free from reacting with $CeO_2$ and $ZrO_2$ at 700° C. or more, preferably at 900° C. or more and further preferably at 1,000° C. or more, it is possible to exemplify $Al_2O_3$, $SiO_2$, $TiO_2$, and so on. Among them, $Al_2O_3$ of good heat resistance is especially desirable option. Further, in the $CeO_2$—$ZrO_2$-based composite oxide, an atomic ratio of Ce with respect to Zr (i.e., Ce/Zr) can preferably fall in a range of from 1/9 to 9/1, especially preferably in a range of from 3/7 to 7/3. When Ce is less than the lower limit value of the range, the resulting composite oxide or support is insufficient in terms of the OSC. When Zr is less than the lower limit value of the range, the stability of the $CeO_2$—$ZrO_2$-based composite oxide lowers so that the resulting composite oxide or support exhibits a small specific surface area. Furthermore, assume that M is the metal of the reaction-free metallic oxide, an atomic ratio of M with respect to the sum of Ce and Zr (i.e., M/(Ce+Zr)) can preferably fall in a range of from 1/5 to 5/1, especially preferably in a range of from 1/3 to 3/1. When the metal M is less than the lower limit value of the range, the specific surface area of the resulting composite oxide diminishes. When the metal M is more than the upper limit value of the range, the resulting composite oxide exhibits a lowered OSC in consequence of the relatively reduced $CeO_2$ content.

When the metallic oxide, which is free from reacting with $CeO_2$ and $ZrO_2$ at 700° C. or more, preferably at 900° C. or more, further preferably at 1,000° C. or more, is $Al_2O_3$, it is desired that the metallic oxide can desirably further include an oxide of rare-earth elements. As for the oxides of rare-earth elements, it is possible to exemplify oxides of La, Nd, Sm, Pr, and so forth. Among them, $La_2O_3$ is the most preferable option to improve the heat resistance.

When the oxides of rare-earth elements are included, the sum of the number of rare-earth element atoms and the number of Al atoms can be considered the number of atoms of the metal M. Then, the compositional ratio of the sum with respect to the sum of Ce atoms and Zr atoms in the $CeO_2$—$ZrO_2$ composite oxide can be controlled to fall in the above-described atomic ratio range.

Since the above-described ternary composite oxide has the aforementioned special arrangements, it has a specific surface area of from 20 to 60 cm²/g larger than those of the conventional $CeO_2$—$ZrO_2$ composite oxides even after it is subjected to reducing heat treatments or high-temperature durability tests.

In the exhaust gas reducing co-catalysts according to the present invention, it is possible to use one or more noble metals, selected from the group consisting of Pt, Rh, Pd, Ir, Ru, and so on, as the noble metal to be loaded on the above-described support. The loading amount can be the same as those of the conventional exhaust gas reducing co-catalysts. Moreover, as for the loading method, it is likewise possible to utilize the conventional loading methods, such as the adsorption loading method, the impregnation loading method, etc.

It is possible to produce the $CeO_2$—$ZrO_2$-based composite oxide or the ternary composite oxide by a co-precipitation method, and the like. For instance, it is possible to produce the $CeO_2$—$ZrO_2$-based composite oxide by a process which comprises the steps of: adding a precipitant to a solution comprising a cerium compound and a zirconium compound, thereby generating precipitates by a co-precipitation method; and calcining the resultant precipitates. Note that, when the ternary composite oxide is produced, it is possible to use a mixture solution which comprises a cerium compound, a zirconium compound and a metal compound whose oxide is free from reacting with $CeO_2$ and $ZrO_2$ at 700° C. or more, preferably at 900° C. or more, further preferably at 1,000° C. or more.

It is possible to carry out the reducing heat treatment, one of the features of the present invention, in the following manner. After loading a noble metal on the support, the support is heated to and held at a temperature of from 600 to 1,000° C. in a reducing atmosphere. When the support is heated to and held at a temperature of lower than 600° C., it is difficult to form the regularly oriented phase in the resulting composite oxide. Accordingly, the resultant exhaust gas reducing co-catalyst exhibits a lowered OSC. On the other hand, when the support is heated to and held at a temperature of higher than 1,000° C., the noble metal unpreferably causes considerable granular growth. By controlling the heat treatment temperature in the range of from 600 to 1,000° C., the Ce cations and Zr cations are oriented regularly so that it is possible to produce the present exhaust gas reducing co-catalysts which exhibit a large specific surface area and in which the particle diameters of the noble metal are equalized.

It is desired that the reducing atmosphere can be atmospheres which actively include reducing gases, such as $H_2$, CO, etc., rather than inert gas atmospheres or non-oxidizing atmospheres. When the reducing gases are not included, the elimination of oxygen atoms from crystalline lattices does not develop at a sufficiently fast rate so that the regularly oriented phase is not fully formed. As a result, the resulting exhaust gas reducing co-catalyst might not attain a high OSC.

Therefore, in the present exhaust gas reducing co-catalysts, the noble metal makes the outlet and inlet for storing and releasing oxygen atoms. Accordingly, it is possible to release oxygen atoms in a reducing heat treatment even at a temperature of from 600 to 1,000° C. approximately lower than the conventional temperature at which oxygen atoms are released. When oxygen atoms are thus released with ease, the Ce cations and Zr cations make a much more regulatory orientation by the reducing heat treatment, and oxygen atoms are readily stored and released in fluctuating atmospheres in service so that the present exhaust gas reducing co-catalysts reveal a high OSC. Thus, their co-catalytic activities are improved remarkably.

When the support includes the above-described ternary composite oxide, the metallic oxide, which is free from reacting with $CeO_2$ and $ZrO_2$ at 700° C. or more, preferably at 900° C. or more, further preferably at 1,000° C. or more, intervenes between the $CeO_2$—$ZrO_2$ composite oxide. Consequently, the $CeO_2$—$ZrO_2$ composite oxide is inhibited from reacting with each other in the reducing heat treatment. Moreover, since the granular growth of the $CeO_2$—$ZrO_2$ composite oxide is suppressed, the $CeO_2$—$ZrO_2$ composite oxide keeps exhibiting a large specific surface area. As a result, the support stores and releases oxygen atoms much more readily.

In the process for producing a composite oxide according to the present invention by which the present composite oxide can be produced, a precipitant is added to a solution comprising a cerium compound, a zirconium compound and a metal compound whose oxide is free from reacting with $CeO_2$ and $ZrO_2$ at 700° C. or more, preferably at 900° C. or more, further preferably at 1,000° C. or more, thereby generating precipitates by a co-precipitation method; the precipitates are calcined; and the precipitates are reduced by heating to and holding at a temperature of from 700 to 1,200° C. in a reducing atmosphere.

As for the cerium compound, the zirconium compound or the metal compound whose oxide is free from reacting with $CeO_2$ and $ZrO_2$ at 700° C. or more, preferably at 900° C. or more, further preferably at 1,000° C. or more, it is possible to use water soluble compounds, such as nitrates, sulfates, chlorides, etc. Moreover, as for the precipitant, it is possible to use ammonia, hydroxides of alkali metals, carbonates of alkali metals, and so forth. The precipitates can be co-precipitated from a mixture aqueous solution in which the cerium compound and the zirconium compound coexist, and thereafter can be calcined to generate $CeO_2$ and $ZrO_2$. Alternatively, precipitates of $CeO_2$ precursors and precipitates of $ZrO_2$ precursors can be formed, respectively, the two precipitates can be mixed, and thereafter the resultant mixture can be calcined. The descriptions herein are similarly applicable to the ternary composite oxide.

There are a variety of adjusting methods how to deposit the precipitates. For instance, there are a method of adding ammonia water, etc., spontaneously and stirring it heavily; a method of adjusting the pH, at which oxide precursors start depositing, by adding hydrogen peroxide and thereafter depositing the precipitates by using ammonia water, and so on. Moreover, there are the following methods: a method of sufficiently extending the time required for neutralizing the aqueous solutions of the metallic acid salts by using ammonia water, etc., preferably neutralizing them for 10 minutes or more; a method of neutralizing the aqueous solutions of the metallic acid salts stepwise while monitoring the pH; adding a buffer solution so that the aqueous solutions of the metallic acid salts keep to exhibit a predetermined pH; and the like.

In the step of generating the precipitates, the solution can desirably be stirred always at a shear rate of 1,000 $sec^{-1}$ or more. Thus, the particle diameters of the generating oxide precursors can be made extremely finer, and accordingly the particle diameters of the composite oxide can be made much smaller. Note that it is desirable to make the particle diameters of the oxide precursors 3 μm or less. When the particle diameters are larger than the value, the particle diameters of the generating composite oxide enlarge so much that the activities are diminished by the decrement of the specific surface area.

The composite oxide which is produced by the present production process comprises agglomerated particles, in which $CeO_2$ and $ZrO_2$ formed as fine particles and having an average diameter of 50 nm or less are agglomerated and whose average particle diameter is 20 μm or less, in general. Moreover, at least a part of the $CeO_2$ and $ZrO_2$ form a solid solution.

In the present production process, it is desired that, before calcining the precipitates, the precipitates can desirably be aged in a suspended state in which water or a solution including water makes a dispersion medium or in a state in which water is present sufficiently. By carrying out the aging treatment, the particle diameters of the resulting composite oxide are equalized. Accordingly, the superficial partial pressures, one of the driving forces of granular growth, are equalized. As a result, it is possible to furthermore suppress the granular growth in the subsequent reducing heat treatment.

The aging treatment can be carried out in the following manner. The solution containing the precipitates is heated as a whole in a pressure-resistant and heat-resistant container, such as an autoclave, etc., while water is present sufficiently in the system. Thereafter, the solvent is evaporated, and the resulting precipitates are calcined. Alternatively, the filtered precipitates can be calcined in the presence of water vapor. In this case, the precipitates can preferably be calcined in a saturated water vapor atmosphere. It is especially desirable to carry out a hydrothermal treatment at a temperature of from 100 to 200° C., further preferably at a temperature of from 100 to 150° C. When the heat application is less than 100° C., the facilitating effect of aging arises less, and the time required for aging is prolonged too much. When it is more than 200° C., a synthesizing apparatus, which can endure a pressure of 10 atm (i.e., 10,013,250 Pa) or more, is required, and consequently the equipment cost goes up.

In the case where the above-described aging treatment is carried out, the solving and re-crystallizing of the precipitates are facilitated by the application of heat, and simultaneously there arises the growth of the particles. In this case, it is desirable to neutralize the solution with a base in an equivalent amount or more for neutralizing all of the acid salts. Thus, the oxide precursors are aged more uniformly, and the pores are formed effectively. At the same time, the formation of $ZrO_2$—$CeO_2$ solid solutions is furthermore facilitated.

The reducing treatment, one of the features of the present invention, is carried out in the following manner. The composite oxides, which are prepared in the above-described manner, are heated to and held at a temperature of from 700 to 1,200° C. in a reducing atmosphere. When the heat treatment temperature is lower than 700° C., it is difficult to form the regulatory phase of the Ce cations and the Zr cations so that the resulting composite oxide exhibits a lowered OSC. When the heat treatment temperature is higher than 1,200° C., the resulting composite oxide unpreferably exhibits a sharply decreased specific surface area. By controlling the heat treatment temperature in the range of from 700 to 1,200° C., it is possible to produce the present composite oxide having a regularly oriented phase in which at least a part of the Ce cations and the Zr cations are oriented regularly, for example, a pyrochlore phase, etc., and having a large specific surface area.

Moreover, in the case where the metallic oxide, which is free from reacting with $CeO_2$ and $ZrO_2$ at 700° C. or more, preferably at 900° C. or more, further preferably at 1,000° C. or more, intervenes between the $CeO_2$—$ZrO_2$ composite oxide, the granular growth of the $CeO_2$—$ZrO_2$ composite oxide is suppressed when the reducing heat treatment is carried out at a high temperature of from 700 to 1,200° C. Consequently, the resulting present composite oxide has a large specific surface area, and simultaneously has a regularly oriented phase in which at least a part of the Ce cations and the Zr cations are oriented regularly, for example, a pyrochlore phase, etc.

Inert gas atmospheres or non-oxidizing atmospheres can be utilized instead of the reducing atmosphere. However, it is desired that the reducing atmosphere can be atmospheres which actively include reducing gases, such as $H_2$, CO, etc. When the reducing gases are not included, the elimination of oxygen atoms from crystalline lattices do not develop at a sufficiently fast rate so that the regularly oriented phase, for example, a pyrochlore phase, etc., is not fully formed. As a result, the resulting composite oxide might not attain a high OSC.

Namely, the present composite oxide can improve the regularity between the Ce cations and the Zr cations, and accordingly can attain a large specific surface area and a high OSC simultaneously even after it is heat-treated at a high temperature. Accordingly, the present exhaust gas reducing co-catalysts, in which the present composite oxide makes the support, reveal high reducing activities. Moreover, in the present exhaust gas reducing co-catalysts, the particle diameters of the noble metal are equalized so that the granular growth is suppressed, and consequently the durability is furthermore improved. Moreover, by the present production process, it is possible to produce the present composite oxide readily and securely.

EXAMPLES

Hereinafter, the present invention will be described in detail with reference to specific examples and comparative examples.

Example No. 1

Aluminum nitrate nona-hydrate $(Al(NO_3)_3 \cdot 9H_2O)$, cerium nitrate hexa-hydrate $(Ce(NO_3)_4 \cdot 6H_2O)$ and zirconyl oxynitrate di-hydrate $(ZrO(NO_3)_2 \cdot 2H_2O)$ were solved in pure water in predetermined amounts, respectively. While stirring the mixture aqueous solution vigorously, ammonium water was added to the mixture aqueous solution. The ammonium water included $NH_3$ in an amount as much as 1.2 times by mole for the neutralization equivalent of the respective nitrates. After the thus precipitated precursors were evaporated to dry at 150° C., the precursors were further dried at 300° C. for 3 hours. Thereafter, the precursors were calcined at 500° C. for 1 hour, and were further heat-treated at 700° C. for 5 hours. Thus, a ternary composite oxide was prepared. Note that the composition ratio of the composite oxide was $Al_2O_3:CeO_2:ZrO_2=1:0.9:1.1$ by mol.

Then, an aqueous solution of platinum (II) dinitro diammine having a predetermined concentration was impregnated into the resultant composite oxide in a predetermined amount. The composite oxide was further calcined in air at 300° C. for 3 hours, thereby loading Pt thereon. Note that the loading amount of Pt was 1 part by weight of Pt with respect to 100 parts by weight of the composite oxide.

Moreover, the composite oxide with Pt loaded was reduced in an $N_2$ gas atmosphere at 1,000° C. for 5 hours. The $N_2$ gas atmosphere included $H_2$ in an amount of 5% by volume. Thereafter, the composite oxide was compacted to a green compact by a forming pressure of 1,000 kgf/cm² (i.e., 98.07 MPa). Then, the resulting green compact was pulverized to a pelletized co-catalyst having particle diameters of from 0.5 to 1 mm.

Example No. 2

Except that the ternary composite oxide, on which Pt was loaded in the same manner as Example 1, was reduced in the $N_2$ gas atmosphere, which included $H_2$ in an amount of 5% by volume, at 900° C. for 5 hours, a pelletized co-catalyst of Example No. 2 was prepared in the same manner as Example No. 1.

Example No. 3

Except that the ternary composite oxide, on which Pt was loaded in the same manner as Example 1, was reduced in the $N_2$ gas atmosphere, which included $H_2$ in an amount of 5% by volume, at 800° C. for 5 hours, a pelletized co-catalyst of Example No. 3 was prepared in the same manner as Example No. 1.

Example No. 4

The ternary composite oxide prepared in Example No. 1 was reduced in an $N_2$ gas atmosphere at 1,000° C. for 5 hours. The $N_2$ gas atmosphere included $H_2$ in an amount of 5% by volume. Thereafter, Pt was loaded in the same manner as Example No. 1, thereby making a pelletized co-catalyst of Example No. 4.

Comparative Example No. 1

Except that the ternary composite oxide, on which Pt was loaded in the same manner as Example No. 1, was reduced in an $N_2$ gas atmosphere at 1,000° C. for 5 hours, a pelletized co-catalyst of Comparative Example No. 1 was prepared in the same manner as Example No. 1. The $N_2$ gas atmosphere was free from $H_2$.

Comparative Example No. 2

Except that the ternary composite oxide, on which Pt was loaded in the same manner as Example No. 1, was reduced in air at 1,000° C. for 5 hours, a pelletized co-catalyst of Comparative Example No. 2 was prepared in the same manner as Example No. 1.

Examination and Evaluation

The palletized co-catalysts of Example Nos. 1 through 4 and the pelletized co-catalysts of Comparative Example Nos. 1 and 2 were disposed in a testing apparatus, respectively. Then, they were held in an atmosphere in which a rich model gas and a lean model gas whose compositions are set forth in Table 1 were flowed at a space velocity SV of 10,000 hr⁻¹ alternately for 5 minutes each, and the temperature of the pelletized co-catalysts was increased at a temperature increment rate of 12° C./min. Under the testing conditions, the pelletized co-catalysts were measured for the NO, CO and $C_3H_6$ conversions continuously in a temperature range of from 100 to 500° C. Thus, temperatures at which NO, CO and $C_3H_6$ were purified by 50%, respectively, were found out. Table 2 summarizes the results in the column of "Initial T50 (° C.)."

TABLE 1

| | $C_3H_6$ (ppm) | CO (%) | $CO_2$ (%) | $H_2$ (%) | $O_2$ (%) | $H_2O$ (%) | $N_2$ |
|---|---|---|---|---|---|---|---|
| Rich Model Gas | 800 | 0.1 | 10 | 5 | 0.2 | 3 | Balance |
| Lean Model Gas | 800 | 0.1 | 10 | None | 5 | 3 | Balance |

Moreover, the respective pelletized co-catalysts were used by 0.1 g, and their oxygen storage-and-release amount was measured by the thermal weight analysis. The measurement was carried out in the following manner. The respective pelletized co-catalysts were held in an atmosphere in which a first $N_2$ gas and a second $N_2$ gas were flowed alternately, their weight reduction and increment at 500° C. were measured. The first $N_2$ gas included $H_2$ in an amount of 10% by volume. The second $N_2$ gas included $O_2$ in an amount of 5% by volume. From the measured values, their OSC was calculated, respectively. Note that the respective pelletized co-catalysts were measured for the specific surface area as well by the one-point BET method in which $N_2$ adsorption was used. Table 2 also summarizes these results altogether.

TABLE 2

| | Heat Treatment Conditions | | | Initial T50 (° C.) | | | Post-Durability T50 (° C.) | | | Initial OSC* | Initial BET |
|---|---|---|---|---|---|---|---|---|---|---|---|
| | Temp. | Atmosphere | Pt | NO | CO | $C_3H_6$ | NO | CO | $C_3H_6$ | ($O_2$(mol)/$CeO_2$ mol)) | ($m^2$/g) |
| Ex. #1 | 1,000° C. | $H_2/N_2$ | After Loading | 197 | 163 | 207 | 311 | 284 | 319 | 0.249 | 20 |
| Ex. #2 | 900° C. | $H_2/N_2$ | After Loading | 193 | 158 | 200 | 300 | 278 | 303 | 0.230 | 38 |
| Ex. #3 | 800° C. | $H_2/N_2$ | After Loading | 180 | 147 | 181 | 299 | 270 | 300 | 0.205 | 62 |
| Ex. #4 | 1,000° C. | $H_2/N_2$ | Before Loading | 202 | 168 | 212 | 316 | 289 | 324 | 0.237 | 20 |
| Comp. Ex. #1 | 1,000° C. | $N_2$ | After Loading | 215 | 180 | 226 | 320 | 291 | 329 | 0.145 | 26 |
| Comp. Ex. #2 | 1,000° C. | Air | After Loading | 219 | 182 | 229 | 325 | 295 | 331 | 0.136 | 27 |

*The "Initial OSC" specifies the number of $O_2$ moles released from 1 mole of $CeO_2$.

In addition, the respective pelletized co-catalysts were subjected to a durability test, in which they were held at 1,000° C. for 5 hours while alternately flowing a rich model gas and a lean model gas, set forth in Table 1, at a space velocity SV of 10,000 $hr^{-1}$ for 5 minutes each. Thereafter, temperatures at which NO, CO and $C_3H_6$ were purified by 50%, respectively, were measured in the above-described manner. Table 2 summarizes the results in the column of "Post-Durability T50 (° C.)."

It is understood from Table 2 that the pelletized co-catalysts of the respective examples were better in terms of the initial and post-durability purifying activities and exhibited a higher OSC than those of the pelletized co-catalysts of Comparative Example Nos. 1 and 2. Namely, by the heat treatment in the reducing atmosphere which was carried out before or after loading Pt, it is appreciated that the OSC was sharply improved and thereby the purifying activities were enhanced. Moreover, when taking notice of the OSC, it is seen that, by comparing the pelletized co-catalysts of Example Nos. 1 through 3 with each other, it was more preferable to carry out the heat treatment in the reducing atmosphere at a higher temperature.

Moreover, by comparing the pelletized co-catalysts of Example Nos. 1 through 3 with that of Example No. 4, when the reducing heat treatment was carried out onto the composite oxide on which Pt had been loaded in advance, like Example Nos. 1 through 3, a substantially equivalent OSC was revealed by the reducing heat treatment at a lower temperature than that of the case where the reducing heat treatment was carried out onto the composite oxide on which no Pt was loaded, like Example No. 4. The advantage is believed to result from the fact that, when Pt is loaded on the composite oxide, oxygen atoms are more likely to be released from the inside of crystalline lattices.

Note that, from the viewpoint of purifying activities, it is not necessarily the case that the higher the reducing heat-treatment temperature is the higher the activities are. It is believed that the enlargement of the specific surface area and the improvement of the OSC are phenomena which are related contradictorily with respect to the reducing heat-treatment temperature. In other words, when the reducing heat-treatment temperature is higher, the OSC heightens, but the specific surface area decreases. Accordingly, it is suggested that there is an optimum value for the reducing heat-treatment temperature at which the OSC and the specific surface area are in equilibrium. Moreover, the reason has not been clear yet, the initial and post-durability activities of the pelletized co-catalysts of Example Nos. 1 through 3 were higher than those of the pelletized co-catalyst of Example No. 4. This phenomenon also implies that it is preferable to carry out the reducing heat treatment after loading Pt.

Example No. 5

A cerium (III) nitrate aqueous solution having a predetermined concentration, a zirconyl oxynitrate aqueous solution having a predetermined concentration and an aluminum nitrate aqueous solution having a predetermined concentration were prepared, respectively. The three aqueous solutions were mixed with hydrogen peroxide water, and were fully stirred. The hydrogen peroxide water included $H_2O_2$ in an amount as much as 1.1 times by mol of the cerium ions.

To the mixture aqueous solution, ammonia water was added. The ammonia water included $NH_3$ in an amount as much as 1.2 times by mol of the amount capable of neutralizing all the nitrate groups. Then, the mixture aqueous solution was stirred with a mechanical stirrer and a homogenizer. By the homogenizer, the mixture aqueous solution was sheared at a shearing rate of 1,000 $sec^{-1}$ or more. The resulting co-precipitates (i.e., oxide precursors) were filtered and washed, and were dried in air at 300° C. for 3 hours. Moreover, the co-precipitates were calcined in air at 500° C. for 1 hour.

The resultant oxide powder was reduced in an $N_2$ gas flow at 1,000° C. for 5 hours. The $N_2$ gas flow included $H_2$ in an amount of 5% by volume. Thereafter, the oxide powder was heat-treated in air at 500° C. for 1 hour. Thus, a composite oxide powder according to the present invention was prepared. The composite oxide powder was measured for the specific surface area by the one-point BET method in which $N_2$ adsorption was used. Table 3 summarizes the result of the measurement.

TABLE 3

| | Composite Oxide Composition | Hydrothermal Treatment | Reducing Treatment | Specific Surface Area (m$^2$/g) | Oxygen Storage-&-Release Amount | |
|---|---|---|---|---|---|---|
| | | | | | μmol/g | O$_2$ (mol)/CeO$_2$ (mol)* |
| Ex. #5 | CeO$_2$—ZrO$_2$—Al$_2$O$_3$ | None | Done | 30 | 550 | 0.245 |
| Ex. #6 | CeO$_2$—ZrO$_2$—Al$_2$O$_3$ | Done | Done | 35 | 570 | 0.249 |
| Comp. Ex. #3 | CeO$_2$—ZrO$_2$—Al$_2$O$_3$ | None | None | 70 | 310 | 0.145 |
| Comp. Ex. #4 | CeO$_2$—ZrO$_2$ | None | Done | 1 | 520 | 0.170 |

*The "O$_2$(mol)/CeO$_2$ (mol)" specifies the number of O$_2$ moles released from 1 mole of CeO$_2$.

Subsequently, into the resulting composite oxide powder, an aqueous solution of platinum dinitro diammine having a predetermined concentration was impregnated. After evaporating and drying, the composite oxide powder was calcined in air at 300° C. for 3 hours, thereby loading Pt thereon. Thus, a co-catalyst powder according to the present invention was prepared. Note that the loading amount of Pt was 1 part by weight of Pt with respect to 100 parts by weight of the composite oxide powder.

The co-catalyst powder was weighed by 15 mg. While alternately flowing a first N$_2$ gas and a second N$_2$ gas, the weight reduction and increment at 500° C. were measured by carrying out a thermal weight analysis. The first N$_2$ gas included H$_2$ in an amount of 10% by volume. The second N$_2$ gas included O$_2$ in an amount of 5% by volume. From both of the measured values, the oxygen storage-and-release amount at 500° C. was calculated. Table 3 also summarizes the result. Moreover, the composite oxide powder was subjected to an X-ray diffraction analysis. FIG. 1 illustrates the resultant X-ray diffraction chart.

Example No. 6

Except that co-precipitates, which were prepared in the same manner as Example No. 5, were subjected to a hydrothermal treatment before they were filtered, an oxide powder was prepared in the same manner as Example No. 5. Note that the hydrothermal treatment was carried out under the conditions of 0.12 MPa and 110° C. for 2 hours. Except that the thus treated oxide powder was used, the reducing heat treatment was carried out in the same manner as Example No. 5. Moreover, similarly to Example No. 5, Pt was loaded on the resultant composite oxide powder to prepare a co-catalyst powder of Example No. 6.

Figure 2:
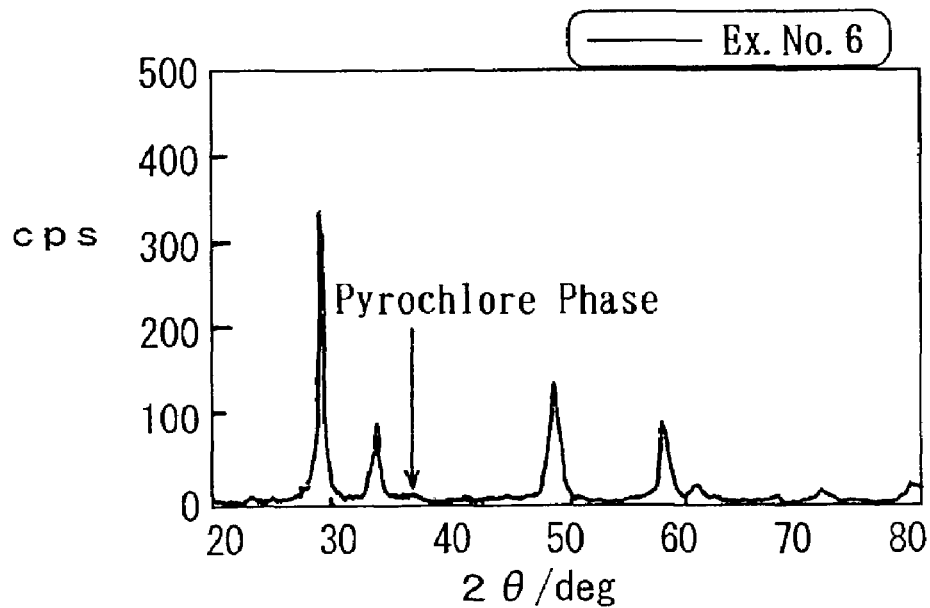
FIG. 2 is an X-ray diffraction chart on a composite oxide of Example No. 5.

In the same manner as Example No. 5, the resulting composite oxide powder was measured for the specific surface area, and the co-catalyst powder of Example No. 6 was measured for the oxygen storage-and-release amount. Table 3 summarizes the results. Moreover, the composite oxide powder was subjected to an X-ray diffraction analysis. FIG. 2 illustrates the resultant X-ray diffraction chart.

Comparative Example No. 3

Except that the reducing heat treatment was not carried out, an oxide powder was prepared in the same manner as Example No. 5. Then, similarly to Example No. 5, Pt was loaded on the resultant composite oxide powder to prepare a co-catalyst powder of Comparative Example No. 4.

Figure 3:
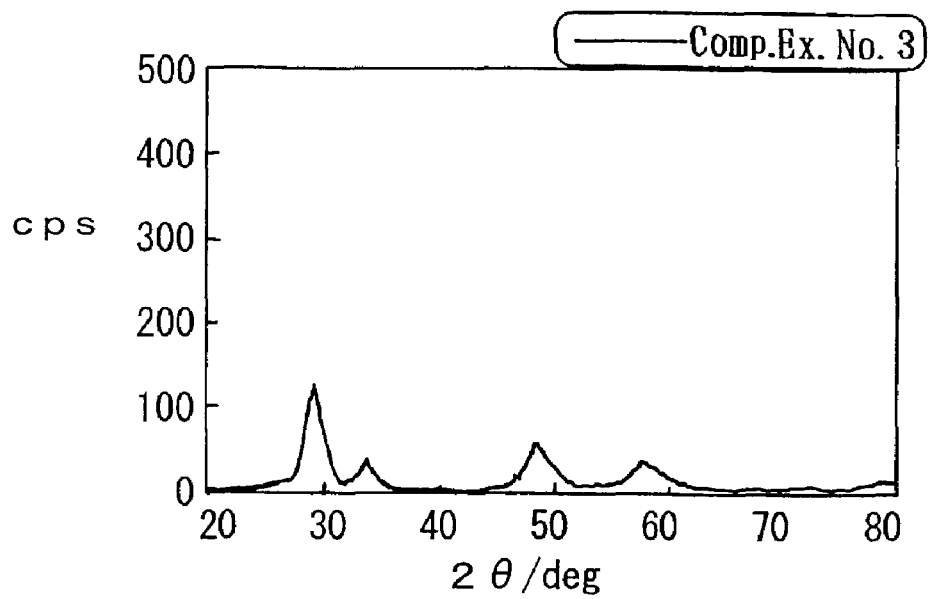
FIG. 3 is an X-ray diffraction chart on a composite oxide of Comparative Example No. 4.

In the same manner as Example No. 5, the resulting composite oxide powder was measured for the specific surface area, and the co-catalyst powder of Comparative Example No. 3 was measured for the oxygen storage-and-release amount. Table 3 summarizes the results. Moreover, the composite oxide powder was subjected to an X-ray diffraction analysis. FIG. 3 illustrates the resultant X-ray diffraction chart.

Comparative Example No. 4

Except that no aluminum nitrate was used, an oxide powder was prepared in the same manner as Example No. 5. Then, similarly to Example No. 5, Pt was loaded on the resultant composite oxide powder to prepare a co-catalyst powder of Comparative Example No. 4.

Figure 4:
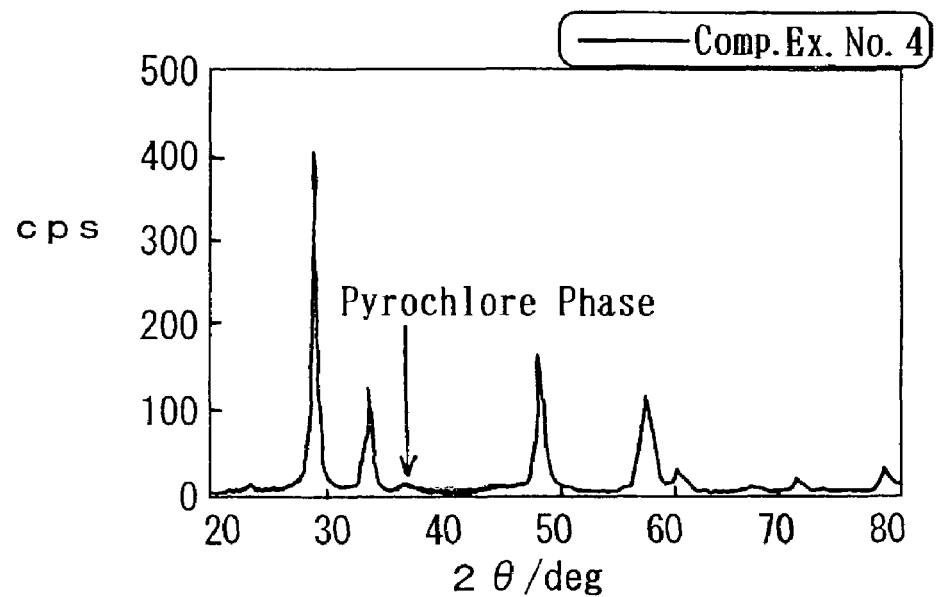
FIG. 4 is an X-ray diffraction chart on a composite oxide of Comparative Example No. 5.

In the same manner as Example No. 5, the resulting composite oxide powder was measured for the specific surface area, and the co-catalyst powder of Comparative Example No. 4 was measured for the oxygen storage-and-release amount. Table 3 summarizes the results. Moreover, the composite oxide powder was subjected to an X-ray diffraction analysis. FIG. 4 illustrates the resultant X-ray diffraction chart.

<Evaluation>

From FIGS. 1 through 4, it is seen that a peak was observed at 2θ=37° in Example Nos. 5 and 6 as well as Comparative Example No. 4. The peak derived from a pyrochlore phase, and was not observed in Comparative Example No. 3.

Further, it is understood from Table 3 that the composite oxide of Comparative Example No. 3 exhibited a specific surface area remarkably larger than those of Example Nos. 5 and 6 as well as Comparative Example No. 4, but that the co-catalyst of Comparative Example No. 3 showed a lower oxygen storage-and-release amount than those of Example Nos. 5 and 6 as well as Comparative Example No. 4. The phenomena are believed to arise as follows. Namely, in Comparative Example No. 3, since the reducing heat treatment was not carried out, the granular growth did not occur. However, in Comparative Example No. 3, since no pyrochlore phase was formed, the co-catalyst of Comparative Example No. 3 did not reveal a satisfactory oxygen storage-and-release amount.

On the contrary, the composite oxide of Example Nos. 5 and 6 did not had a specific surface area as large as that of Comparative Example No. 3, but the co-catalyst of Example Nos. 5 and 6 exhibited a higher oxygen storage-and-release amount than that of Comparative Example No. 3. It is believed that the formation of the pyrochlore phase compensated for the decrement of the specific surface area accompanied by the reducing heat treatment so that the co-catalysts of Example Nos. 5 and 6 effected the activity.

Furthermore, the composite oxide of Comparative Example No. 4 exhibited a remarkably smaller specific surface area than those of Example Nos. 5 and 6 as well as Comparative Example No. 3. The disadvantage is recognized to result from the granular growth which was caused by reducing the composite oxide free from intervening $Al_2O_3$. Accordingly, although the co-catalyst of Comparative Example No. 4 included the pyrochlore phase, it showed the oxygen storage-and-release amount lower than those of Example Nos. 5 and 6.

Moreover, the composite oxide of Example No. 6 had the specific surface area larger than that of Example No. 5, and the co-catalyst of Example No. 6 exhibited the oxygen storage-and-release amount higher than that of Example No. 5. Thus, it is understood that it is desirable to carry out a hydrothermal treatment in the production of the composite oxide. In addition, note that the composite oxide powder of Example No. 5 was identical with that of Example No. 4 in regard to the composition, the reducing heat-treatment conditions and the loading order of Pt. However, in Example No. 5, since the composite oxide powder was produced by way of the step of adjusting the pH of the mixture aqueous solution and the step of shearing the mixture aqueous solution, the composite oxide powder of Example No. 5 had the specific surface area larger than that of Example No. 4.

Having now fully described the present invention, it will be apparent to one of ordinary skill in the art that many changes and modifications can be made thereto without departing from the spirit or scope of the present invention as set forth herein including the appended claims.

What is claimed is:

1. A composite oxide, comprising $CeO_2$ and $ZrO_2$ as major components, and the composite oxide having a regularly orientated phase in which at least a part of Ce cations and Zr cations are oriented alternately and having a specific surface area of 20 $m^2/g$ or more.

2. The composite oxide set forth in claim 1 having a specific surface area of 35 $m^2/g$ or more.

3. The composite oxide set forth in claim 2 having a specific surface area of 60 $m^2/g$ or more.

4. The composite oxide set forth in claim 1, which is composed of $CeO_2$, $ZrO_2$ and a metallic oxide being free from reacting with $CeO_2$ and $ZrO_2$ at 700° C. or more.

5. The composite oxide set forth in claim 4, wherein the metallic oxide is free from reacting with $CeO_2$ and $ZrO_2$ at 900° C. or more.

6. The composite oxide set forth in claim 5, wherein the metallic oxide is free from reacting with $CeO_2$ and $ZrO_2$ at 1,000° C. or more.

7. The composite oxide set forth in claim 4, wherein the metallic oxide, being free from reacting with $CeO_2$ and $ZrO_2$ at 700° C. or more, is $Al_2O_3$.

8. The composite oxide set forth in claim 1, wherein the $CeO_2$ and $ZrO_2$ form a solid solution in which they are solved with each other partially at least.

9. An exhaust gas reducing co-catalyst, comprising a support comprising the composite oxide set forth in claim 1; and a noble metal loaded on the support.

* * * * *